United States Patent
Chung et al.

(10) Patent No.: US 11,500,214 B2
(45) Date of Patent: Nov. 15, 2022

(54) AUGMENTED REALITY DEVICE

(71) Applicant: PEGATRON CORPORATION, Taipei (TW)

(72) Inventors: Chih-Cheng Chung, Taipei (TW); Hsiao-Cheng Chen, Taipei (TW); Cheng-Yi Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 360 days.

(21) Appl. No.: 16/808,477

(22) Filed: Mar. 4, 2020

(65) Prior Publication Data
US 2020/0326552 A1    Oct. 15, 2020

(30) Foreign Application Priority Data

Apr. 15, 2019 (TW) .................. 108113113

(51) Int. Cl.
*G02B 27/01* (2006.01)
(52) U.S. Cl.
CPC .... *G02B 27/0176* (2013.01); *G02B 2027/015* (2013.01); *G02B 2027/0154* (2013.01); *G02B 2027/0178* (2013.01)
(58) Field of Classification Search
CPC ............ G02B 27/0149; G02B 27/0176; G02B 27/0179; G02B 2027/0178;
(Continued)

(56) References Cited

U.S. PATENT DOCUMENTS 5,003,300 A * 3/1991 Wells ................ H04N 3/08
340/980
5,266,930 A * 11/1993 Ichikawa ............... A42B 3/221
359/632
(Continued)

FOREIGN PATENT DOCUMENTS

CN    102004317 A    4/2011
CN    203786391 U    8/2014
(Continued)

OTHER PUBLICATIONS

EESR issued in corresponding European patent application No. 20165892.9-1001 dated Jul. 27, 2020.

*Primary Examiner* — William Boddie
*Assistant Examiner* — Bipin Gyawali
(74) *Attorney, Agent, or Firm* — McClure, Qualey & Rodack, LLP

(57) ABSTRACT

An augmented reality (AR) device includes a main body, a support element, and a lens module. The main body includes a base, a projector, and a first pivot portion. The projector is pivoted to the base by using the first pivot portion, so that the projector is capable of rotating relative to the base by using the first pivot portion as a first rotation axis. The support element is pivoted to a first end portion of the base and is configured to wear on a head of a user. The lens module is pivoted to a second end portion of the base and the second end portion is opposite to the first end portion. The lens module is capable of rotating relative to the base and being overlapped under the base. Through a rotatable and foldable accommodation structure, the augmented reality device is easier to be carried and accommodated.

11 Claims, 3 Drawing Sheets

(58) Field of Classification Search
CPC .... G02B 2027/0161; G02B 2027/0154; G02B 2027/0156
See application file for complete search history.

(56) References Cited

U.S. PATENT DOCUMENTS

| | | | |
|---|---|---|---|
| 5,815,126 A * | 9/1998 | Fan | G02B 27/017 345/87 |
| 7,992,996 B2 | 8/2011 | Sugihara et al. | |
| 8,493,287 B2 | 7/2013 | Yamamoto | |
| 10,018,848 B2 | 7/2018 | Chenchev et al. | |
| 2007/0081818 A1* | 4/2007 | Castaneda | H04N 5/2259 396/429 |
| 2018/0004002 A1* | 1/2018 | Rong | G02B 27/0176 |

FOREIGN PATENT DOCUMENTS

| | | |
|---|---|---|
| CN | 104423040 A | 3/2015 |
| CN | 205080328 U | 3/2016 |
| CN | 207133510 U | 3/2018 |
| DE | 1804431 A | 6/1971 |
| DE | 1804431 A1 | 6/1971 |
| EP | 0344881 A2 | 12/1989 |
| GB | 2238627 A | 6/1991 |
| JP | H11202797 A | 7/1999 |
| JP | 2003279883 A | 10/2003 |
| JP | 2008022362 A | 1/2008 |
| JP | 2008067285 A | 3/2008 |
| JP | 2015138137 A | 7/2015 |
| JP | 2016206374 A | 12/2016 |
| KR | 200136641 Y1 | 11/1998 |

\* cited by examiner

AUGMENTED REALITY DEVICE

CROSS-REFERENCE TO RELATED APPLICATION

This non-provisional application claims priority under 35 U.S.C. § 119(a) to Patent Application No. 108113113 filed in Taiwan, R.O.C. on Apr. 15, 2019, the entire contents of which are hereby incorporated by reference.

BACKGROUND

Technical Field

The application relates to an augmented reality (AR) device, and in particular, to a foldable AR device.

Related Art

With the maturity and increasing applications of an augmented reality (AR) technology and a virtual reality (VR) technology, various improvements start to be made to related equipment or devices. The AR is mainly to project a virtual image onto a display by using a projector or a combination of a projector and a camera. For example, in an AR catch mode of Pokemon, a real environment image is displayed on a screen by using a camera. Pokemons are combined with the real environment, and virtual-real mixed experience that virtual Pokemon characters really appear in the real environment is brought to users.

To be applied to a more complex game or combined with a shooting game, a survival game, or the like, a spectacle-type AR device is produced. However, an image needs to be projected onto glass lenses through a projection device, so that the virtual image can be combined with a real image. Therefore, the spectacle-type AR devices are relatively large in size and mostly cannot be received into a portable form.

SUMMARY

In view of this, an embodiment of the application provides an augmented reality (AR) device including a main body, a support element, and a lens module. The main body includes a base, a projector, and a first pivot portion. The projector is pivoted to the base by using the first pivot portion, so that the projector is capable of rotating relative to the base by using the first pivot portion as a first rotation axis. The support element is pivoted to a first end portion of the base and is configured to wear on a head of a user. The lens module is pivoted to a second end portion of the base and the second end portion is opposite to the first end portion. The lens module is capable of rotating relative to the base and being overlapped on a lower surface of the base.

In this way, by designing the projector, the support element, and the lens module as a rotatable and foldable accommodation structures, an entire volume of the AR device can be more miniaturized after accommodation, so that the AR device is easier to be carried and accommodated.

In some embodiments, the main body may further include a second pivot portion. The support element is pivoted to the first end portion of the base by using the second pivot portion. In this way, the support element is capable of rotating relative to the base by using the second pivot portion as a second rotation axis. An axial direction of the second rotation axis is perpendicular to an axial direction of the first rotation axis.

In some embodiments, the main body may further include a third pivot portion. The lens module is pivoted to the second end portion of the base by using the third pivot portion. In this way, the lens module is capable of rotating relative to the base by using the third pivot portion as a third rotation axis. An axial direction of the third rotation axis is parallel to an axial direction of the first rotation axis.

In some embodiments, the AR device may further include a drive module disposed on the base and connecting to the first pivot portion and the third pivot portion. The drive module controls the first pivot portion and the third pivot portion to move, so that the projector and the lens module are capable of rotating to a use position or an accommodation position. The projector and the lens module may individually manually rotate to the required use position or accommodation position. Alternatively, the projector and the lens module individually or synchronously rotate to the use position or accommodation position by using the drive module. In this way, when the AR device is to be used, the projector may be simultaneously adjusted to a corresponding use position by individually controlling and adjusting the lens module and the projector, or by only adjusting the lens module.

In some embodiments, the drive module may include a controller, a motor, and a gear. The controller, the motor, and the gear are disposed on the base. The controller is electrically connected to the motor. The motor is connected to the gear. The gear is connected to the first pivot portion and the third pivot portion. After receiving a control signal, the controller controls the motor to drive the gear to drive the first pivot portion and the third pivot portion to rotate, so that the projector and the lens module are capable of rotating to the use position or the accommodation position. In this way, the lens module and the projector can be adjusted, in a manner of electrically controlling and driving, to rotate to a required position.

In some embodiments, the drive module may include a gear set, connected to the first pivot portion and the third pivot portion. When the third pivot portion rotates, the gear set is driven to drive the first pivot portion to rotate, so that the projector and the lens module are capable of rotating to the use position or the accommodation position. In this way, in a manner of manual adjustment, the projector may be simultaneously adjusted to a corresponding use position or accommodation position by adjusting the lens module.

In some embodiments, the projector is perpendicular to a mirror surface of the lens module when the projector and the lens module rotate to the use position. In this way, an image of the projector can be really projected on the mirror surface of the lens module, so that the image is clearer.

In some embodiments, an included angle between a mirror surface of the lens module and the base of the main body is less than 90° when the lens module is at the use position. Preferably, the included angle between the mirror surface of the lens module and the base of the main body is 45°. In this way, the lens module can be still placed across a nose bridge, and eyes of the user can clearly see the image projected on the mirror surface.

In some embodiments, the projector is accommodated in the base and the lens module is overlapped on the lower surface of the base when the projector and the lens module rotate to the accommodation position. In this way, when the projector and the lens module are at the accommodation position, the projector is accommodated in the base and the lens module is overlapped on the lower surface of the base. The entire volume of the AR device can be as a size of the base of the main body after accommodation. By making good use of the structure space, the entire volume can be miniaturized.

In conclusion, for the AR device, by designing the lens module, the support element, and the projector as a rotatable and foldable accommodation structure, the entire volume of the AR device can be miniaturized after accommodation, so that the AR device is easier to be carried and accommodated.

In the following implementations, detailed features and advantages of the application are described in detail. Content of the application is sufficient to enable any person skilled in the art to understand and implement the technical content of the application. The related objectives and advantages of the application can be easily understood by any person skilled in the art according to the content, claims, and drawings disclosed in this specification.

DETAILED DESCRIPTION OF THE EMBODIMENTS

Figure 1:
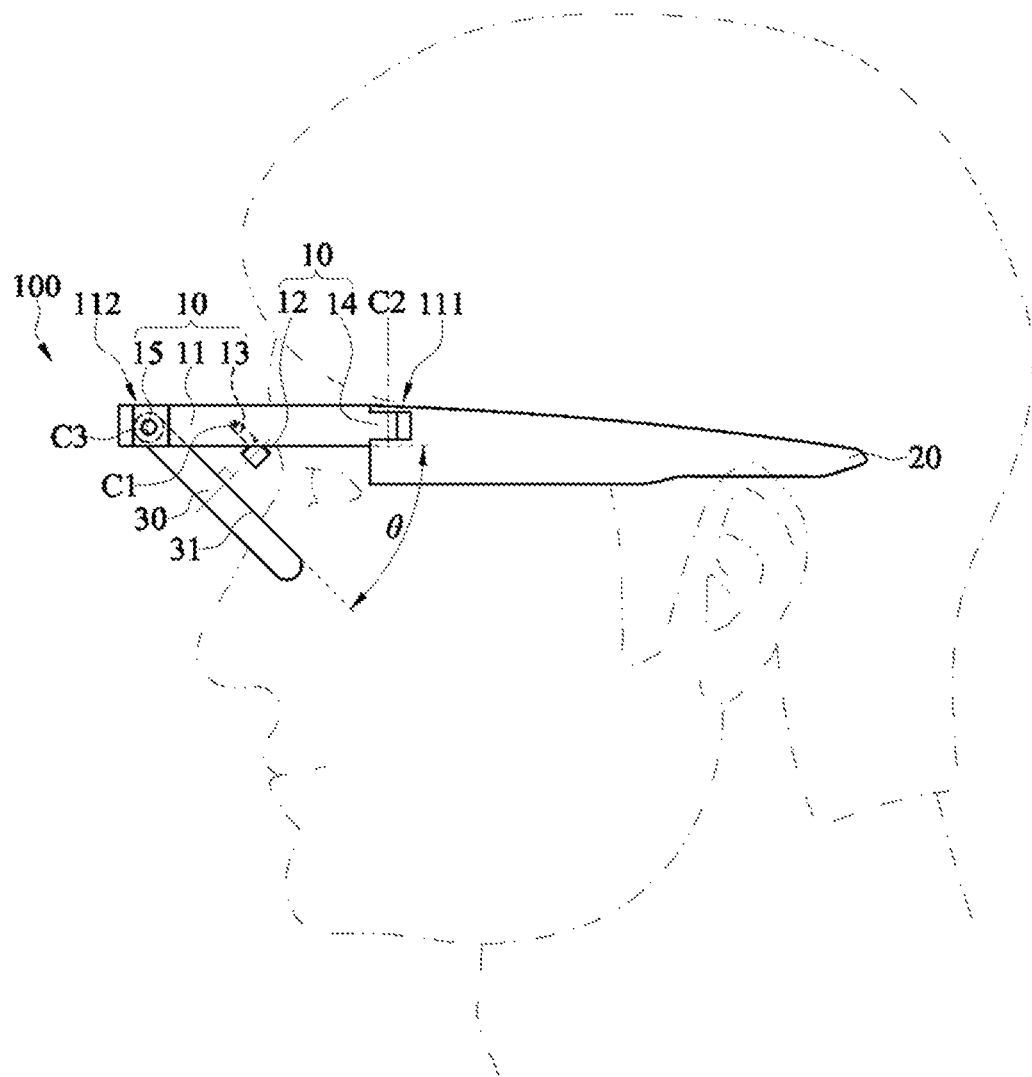
FIG. 1 is a schematic diagram of using an augmented reality (AR) device according to an embodiment of the application.
Figure 2:
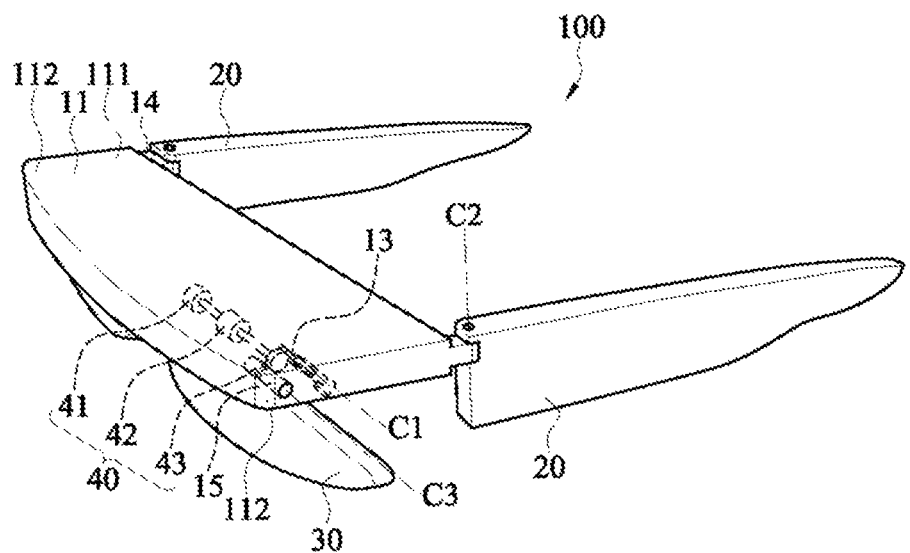
FIG. 2 is a three-dimensional diagram of the AR device at a use position according to an embodiment of the application.
Figure 3:
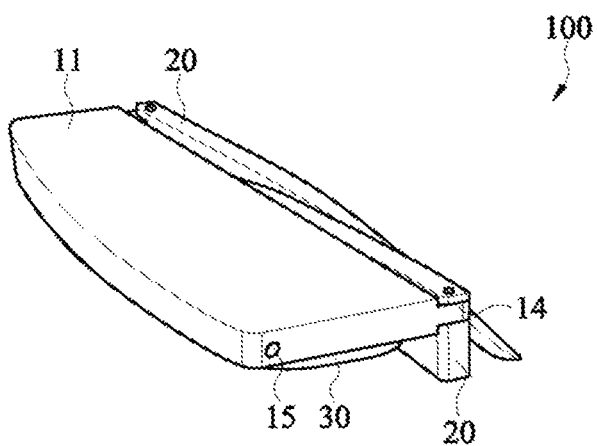
FIG. 3 is a three-dimensional diagram of the AR device at an accommodation position according to an embodiment of the application.

Referring to FIG. 1 to FIG. 3, FIG. 1 is a schematic diagram of using an augmented reality (AR) device according to an embodiment of the application. FIG. 2 is a three-dimensional diagram of the AR device at a use position according to an embodiment of the application. FIG. 3 is a three-dimensional diagram of the AR device at an accommodation position according to an embodiment of the application. The AR device 100 in this embodiment includes a main body 10, a support element 20, and a lens module 30. The main body 10 includes a base 11, a projector 12, and a first pivot portion 13.

The projector 12 is pivoted to the base 11 by using the first pivot portion 13, so that the projector 12 is capable of rotating relative to the base 11 by using the first pivot portion 13 as a first rotation axis C1. It can be seen from FIG. 1 and FIG. 2 that, the first rotation axis C1 is parallel to an axial direction of a long side of the base 11. The projector 12 may rotate around the first rotation axis C1 until the projector 12 is completely accommodated in the base 11 (not shown in the figure). Alternatively, as shown in FIG. 1 and FIG. 2, the projector 12 rotates around the first rotation axis C1 until the projector 12 protrudes outside the base 11.

It can be seen from FIG. 1 to FIG. 3 that, the support element 20 is pivoted to a first end portion 111 of the base 11. The support element 20 is configured to wear on a head of a user. It can be seen from FIG. 1 that, the first end portion 111 and a second end portion 112 of the base 11 are respectively located at two end portions on a short side of the base 11. In this embodiment, the support element 20 is provided with two first end portions 111 respectively disposed on two parallel short sides of the base 11. The support element 20 is capable of rotating, relative to the base 11, to a use position shown in FIG. 2 and an accommodation position shown in FIG. 3.

The lens module 30 is pivoted to the second end portion 112 of the base 11 and the second end portion 112 is opposite to the first end portion 111, so that the lens module 30 is capable of rotating, relative to the base 11, to protrude the base 11 (the use position shown in FIG. 2) or to be overlapped on a lower surface of the base 11 (the accommodation position shown in FIG. 3).

In this way, by designing the lens module 30, the support element 20, and the projector 12 as a rotatable and foldable accommodation structure, an entire volume of the AR device 100 can be miniaturized after accommodation, so that the AR device 100 is easier to be carried and accommodated.

Still referring to FIG. 1 to FIG. 3, the main body 10 further includes a second pivot portion 14 and a third pivot portion 15 respectively disposed on the first end portion 111 and the second end portion 112 of the base 11. The second pivot portion 14 is disposed on a joint of the base 11 and the support element 20. The support element 20 is pivoted to the first end portion 111 of the base 11 by using the second pivot portion 14. In this way, the support element 20 is capable of rotating relative to the base 11 by using the second pivot portion 14 as a second rotation axis C2. An axial direction of the second rotation axis C2 is perpendicular to an axial direction of the first rotation axis C1. In this embodiment, because two support elements 20 are disposed on two sides of the base 11, two second pivot portions 14 are also respectively disposed on first end portions 111 on two long sides of the base 11, so that the two support elements 20 both are capable of rotating around the second rotation axis C2 relative to the base 11. The support element 20 rotates around the second rotation axis C2 relative to the base 11, so that the support element 20 moves to the use position shown in FIG. 2 or the accommodation position shown in FIG. 3.

The third pivot portion 15 is disposed on a joint of the base 11 and the lens module 30. The lens module 30 is pivoted to the second end portion 112 of the base 11 by using the third pivot portion 15. In this way, the lens module 30 is capable of rotating relative to the base 11 by using the third pivot portion 15 as a third rotation axis C3, so that the lens module 30 rotates to the use position or the accommodation position. An axial direction of the third rotation axis C3 is parallel to the axial direction of the first rotation axis C1. It can be seen from FIG. 2 that, the axial direction of the third rotation axis C3 is also parallel to an axial direction of the long side of the base 11, and the third rotation axis C3 is also perpendicular to the second rotation axis C2. In this embodiment, to-be-used electronic elements such as a processor, a circuit board, a driving structure, a wire, a battery may be all disposed in the base 11 of the main body 10. Alternatively, a battery or the like may be disposed in the support element 20, so that the structure of the base 11 or the support element 20 may be properly miniaturized or averages overall weight distribution, to enable the user to feel more comfortable when wearing the AR device, or enable the AR device to be more miniaturized after accommodation.

In addition, in this embodiment, the projector 12 and the lens module 30 are disposed to synchronously rotate to the use position or the accommodation position. For example, the projector 12 and the lens module 30 may synchronously rotate to the use position or the accommodation position by using the driving structure such as a connecting rod or an actuator. In this way, when the user needs to use or accommodate the AR device, the projector 12 may be simultaneously adjusted to the required use position or accommodation position by only adjusting the lens module 30. Further, a switch key may be disposed, so that the user only needs to operate the switch key, and the projector 12 and the lens module 30 can both move to the use position or the accommodation position.

In another embodiment, the projector and the lens module may individually manually rotate to the required use position or accommodation position. Alternatively, the projector and the lens module individually rotate to the use position or accommodation position by using the drive module. In this way, when the AR device is to be used, the lens module and the projector may be individually controlled and adjusted. The application is not limited thereto.

In this embodiment, for example, referring to FIG. 2, the AR device 100 in this embodiment further includes a drive module 40. The drive module 40 is disposed on the base 11 and is connected to the first pivot portion 13 and the third pivot portion 15. The drive module 40 controls the first pivot portion 13 and the third pivot portion 15 to move, so that the projector 12 and the lens module 30 are capable of rotating to the use position or the accommodation position (as shown in FIG. 3).

In this embodiment, the drive module 40 includes a controller 41, a motor 42, and a gear 43. The controller 41, the motor 42, and the gear 43 are disposed on the base 11. The controller 41 is electrically connected to the motor 42. The motor 42 is connected to the gear 43. The gear 43 is connected to the first pivot portion 13 and the third pivot portion 15. After receiving a control signal, the controller 41 controls the motor 42 to drive the gear 43 to drive the first pivot portion 13 and the third pivot portion 15 to rotate, so that the projector 12 and the lens module 30 actuated by the drive module 40 synchronously rotate to the use position or the accommodation position.

In addition, in FIG. 2, an example in which the first pivot portion 13 and the third pivot portion 15 on a single side are drawn is used for description. However, it may be learned that the projector 12 corresponding to a position of another lens and the first pivot portion 13 that pivots the projector 12 to the base 11 may also be disposed on the other opposite short side. Another gear 43 may also be disposed to be connected to the first pivot portion 13. The another gear 43 is connected to the motor 42 by using a connecting rod or the like, so that the controller 41 can control the motor 42 to simultaneously drive the gears 43 on the both sides to drive the first pivot portions 13 on the both sides to rotate. Moreover, the lens module 30 may be pivoted to the base 11 by using one third pivot portion 15, and may also be connected to both sides of the lens module 30 respectively by using two third pivot portions 15. The another gear 43 is also used to drive the third pivot portion 15 on the other side, so that the third pivot portions 15 on the both sides can synchronously rotate.

Through the structure in the foregoing example, the lens module 30 and the projector 12 can be adjusted, in a manner of electrically controlling and driving, to rotate to a required position.

Then, as shown in FIG. 1, the projector 12 is perpendicular to a mirror surface 31 of the lens module 30 when the projector 12 and the lens module 30 rotate to the use position. In this way, an image of the projector 12 can be really projected on the mirror surface 31 of the lens module 30, so that the image is clearer.

When the lens module 30 is at the use position shown in FIG. 1 and FIG. 2, an included angle θ between the mirror surface 31 of the lens module 30 and the base 11 of the main body 10 is less than 90°. Preferably, the included angle θ between the mirror surface 31 of the lens module 30 and the base 11 of the main body 10 is maintained at 45°. In this way, the lens module 30 can be still placed across a nose bridge, and eyes of the user can clearly see the image projected on the lens 31.

In addition, it can be seen from FIG. 3 that, when the projector 12 rotates to the accommodation position, the projector 12 is accommodated in the base 11 of the main body 10. When the lens module 30 also rotates to the accommodation position, the lens module 30 is overlapped on the lower surface of the base 11 of the main body 10. When the support element 20 also rotates to the accommodation position, the support element 20 is overlapped on a side surface of the base 11 of the main body 10. In this way, the entire volume of the AR device 100 can be as a size of the base 11 of the main body 10 after accommodation. By making good use of the structure space, the entire volume can be miniaturized effectively.

In conclusion, for the AR device 100, by designing the lens module 30, the support element 20, and the projector 12 as a rotatable and foldable accommodation structure, the entire volume of the AR device 100 can be miniaturized after accommodation, so that the AR device is easier to be carried and accommodated.

Figure 4:
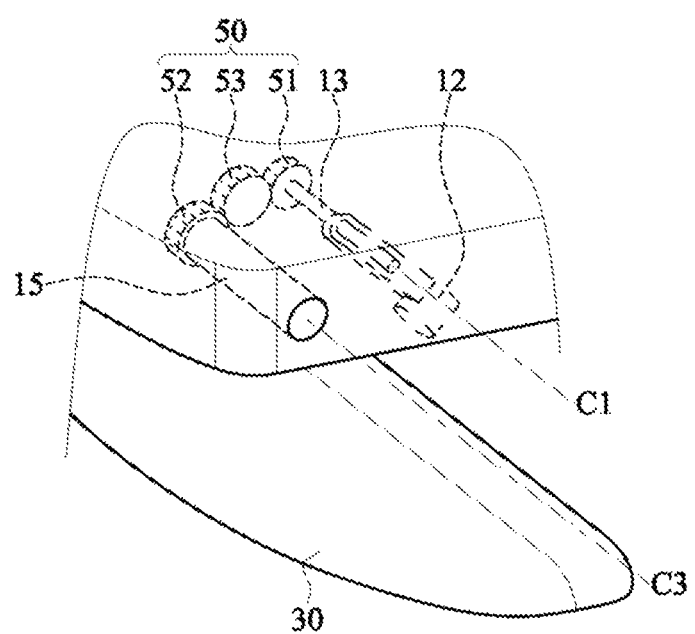
FIG. 4 is a three-dimensional diagram of an AR device at a use position according to another embodiment of the application.

Then, referring to FIG. 4, FIG. 4 is a three-dimensional diagram of an AR device at a use position according to another embodiment of the application. In this embodiment, the elements and structures same as those in the previous embodiment are described by using the same element symbols, and details are not described herein again. A difference between this embodiment and the previous embodiment lies in that: A drive module 50 in this embodiment is a gear set connected to a first pivot portion 13 and a third pivot portion 15. When the third pivot portion 15 rotates, the gear set is driven to drive the first pivot portion 13 to rotate, so that a projector 12 and a lens module 30 synchronously rotate to a use position or an accommodation position.

As shown in FIG. 4, the gear set may be composed of, for example, three gears 51, 52, and 53. The first gear 51 is assembled at the first pivot portion 13, the second gear 52 is assembled at the third pivot portion 15, and the third gear 53 is connected to the first gear 51 and the second gear 52. In this way, when the first gear 51 is driven to rotate, the second gear 52 also rotates synchronously and coaxially. When the second gear 52 is driven to rotate, the first gear 51 also rotates synchronously and coaxially. In this way, when the third pivot portion 15 rotates, the second gear 52 is driven to rotate, so that the second gear 52 drives the third gear 53 to rotate and simultaneously drives the first gear 51 to rotate, thereby synchronously driving the first pivot portion 13 and the third pivot portion 15 to rotate coaxially. As a result, the projector 12 and the lens module 30 synchronously rotate to the use position and the accommodation position.

Similarly, although it is not drawn in the figure, it may be known that if another first pivot portion 13 and third pivot portion 15 are disposed on another short side of a base 11, the gear set may also be disposed correspondingly to drive the another first pivot portion 13 and third pivot portion 15 synchronously.

Although the application is described in the above embodiments, the embodiments are not intended to limit the application. Any person skilled in the art may make variations and improvements without departing from the spirit and scope of the application. Therefore, the protection scope of the application shall be subject to the appended claims of this specification.

What is claimed is:

1. An augmented reality (AR) device, comprising:
a main body, comprising a base, a projector, and a first pivot portion, wherein the projector is pivoted to the base by using the first pivot portion, so that the projector is capable of rotating relative to the base by using the first pivot portion as a first rotation axis;
a support element, pivoted to a first end portion of the base, wherein the support element is configured to wear on a head of a user; and
a lens module, pivoted to a second end portion of the base and the second end portion is opposite to the first end portion, wherein the lens module is capable of rotating relative to the base and being overlapped on a lower surface of the base;
wherein the main body further comprises a third pivot portion, and the lens module is pivoted to the second end portion of the base by using the third pivot portion, so that the lens module is capable of rotating relative to the base by using the third pivot portion as a third rotation axis, and an axial direction of the third rotation axis is parallel to an axial direction of the first rotation axis.

2. The augmented reality device according to claim 1, wherein the main body further comprises a second pivot portion, and the support element is pivoted to the first end portion of the base by using the second pivot portion, so that the support element is capable of rotating relative to the base by using the second pivot portion as a second rotation axis, and an axial direction of the second rotation axis is perpendicular to an axial direction of the first rotation axis.

3. The augmented reality device according to claim 1, further comprising a drive module, wherein the drive module is disposed on the base and connected to the first pivot portion and the third pivot portion, and the drive module controls the first pivot portion and the third pivot portion to move, so that the projector and the lens module are capable of rotating to a use position or an accommodation position;
wherein the drive module comprises a controller, a motor, and a gear, the controller, the motor, and the gear are disposed on the base, the controller is electrically connected to the motor, the motor is connected to the gear, the gear is connected to the first pivot portion and the third pivot portion, and after receiving a control signal, the controller controls the motor to drive the gear to drive the first pivot portion and the third pivot portion to rotate, so that the projector and the lens module are capable of rotating to the use position or the accommodation position.

4. The augmented reality device according to claim 3, wherein the projector is perpendicular to a mirror surface of the lens module when the projector and the lens module rotate to the use position.

5. The augmented reality device according to claim 3, wherein an included angle between a mirror surface of the lens module and the base is less than 90° when the lens module is at the use position.

6. The augmented reality device according to claim 5, wherein the included angle between the mirror surface of the lens module and the base is 45° when the lens module is at the use position.

7. The augmented reality device according to claim 3, wherein the projector is accommodated in the base and the lens module is overlapped on the lower surface of the base when the projector and the lens module rotate to the accommodation position.

8. The augmented reality device according to claim 1, further comprising a drive module, wherein the drive module is disposed on the base and connected to the first pivot portion and the third pivot portion, and the drive module controls the first pivot portion and the third pivot portion to move, so that the projector and the lens module are capable of rotating to a use position or an accommodation position;
wherein the drive module comprises a gear set, connecting to the first pivot portion and the third pivot portion, and when the third pivot portion rotates, the gear set is driven to drive the first pivot portion to rotate, so that the projector and the lens module are capable of rotating to the use position or the accommodation position.

9. The augmented reality device according to claim 8, wherein the projector is perpendicular to a mirror surface of the lens module when the projector and the lens module rotate to the use position.

10. The augmented reality device according to claim 8, wherein an included angle between a mirror surface of the lens module and the base is less than 90° when the lens module is at the use position.

11. The augmented reality device according to claim 8, wherein the projector is accommodated in the base and the lens module is overlapped on the lower surface of the base when the projector and the lens module rotate to the accommodation position.

* * * * *